INVENTOR:
ARTHUR R. PARILLA
BY

ATTORNEYS

Oct. 6, 1964          A. R. PARILLA          3,151,446

PROPULSION DEVICES

Filed Dec. 15, 1959          7 Sheets-Sheet 4

United States Patent Office 3,151,446
Patented Oct. 6, 1964

3,151,446
PROPULSION DEVICES
Arthur R. Parilla, 34 Crestview Road,
Mountain Lakes, N.J.
Filed Dec. 15, 1959, Ser. No. 860,304
20 Claims. (Cl. 60—35.6)

This invention relates to improvements in propulsion devices for use in the upper atmosphere and in space.

This application is a continuation-in-part of my co-pending patent application Serial Number 701,571, filed in the U.S. Patent Office, now Patent No. 3,094,072. The improvements herein are more specifically related to the novel supersonic nozzle configuration shown in FIGURE 22 and described in columns 22 and 23 of the above referenced patent.

It is well known that as rocket engines operate at extremely high altitudes and in space, the nozzle thrust coefficient and hence propellant specific impulse increase as the nozzle area expansion ratio increases. As the ambient pressure approaches zero under such conditions, the pressure ratio approaches infinity even with relatively low chamber pressures. It is, therefore, desirable to provide nozzles with a maximum expansion ratio.

The conventional converging-diverging supersonic nozzle provides good performance at moderate pressure ratios and area ratios, such as at sea-level and moderate altitudes within the atmosphere. But at the high pressure ratios described above, the conventional nozzle is unable to achieve the optimum potential available. At the higher area ratios required, it becomes excessively long and heavy, with increased frictional losses, which place a practical limit on the expansion ratios which may be used.

It is, then, a primary purpose of this invention to apply the new nozzle principles to provide supersonic nozzles having extremely large area ratios together with a substantial reduction in length and weight, and capable of providing superior, high performance in the upper atmosphere and in space.

It is a further object to incorporate features whereby such large expansion ratio nozzles may have a variable throat area, thrust vector directional control, and/or thrust termination or reversal, each alone or in any combination.

A further object is to reduce the control forces required to actuate such variable area, vector control, and thrust termination or reversal means by providing means for pressure balancing the movable member; or providing any desired amount of unbalance acting in either direction.

Another object is to provide an improved configuration for liquid propellant rocket engines having high expansion ratio nozzles for high performance operation.

These and other objects will become apparent from the following detailed description read in connection with the annexed drawings in which similar reference characters represent similar parts, and in which.

Figure 1:
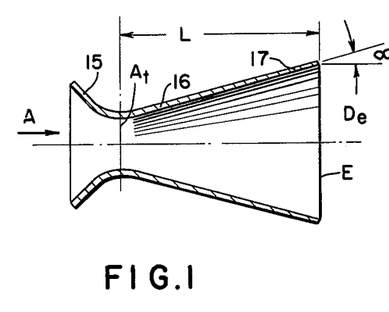
FIGURE 1 illustrates the conventional, widely used convergent-divergent supersonic nozzle, sometimes also called a De Laval nozzle.

The improvements made possible by the new nozzle may best be illustrated by a brief description of the presently known nozzles. FIGURE 1 illustrates the conventional converging-diverging nozzle widely used for supersonic flow of compressible fluids. The working fluid enters the converging section 15 at A at low subsonic velocities and at high pressure, $P_o$. The sub-sonic flow is then accelerated until it reaches the minimum flow area at 16, this being termed the throat area, ($A_t$), where the fluid velocity reaches local sonic velocity, or Mach one. The flow is further accelerated to supersonic velocities in the diverging section 17, which has some divergent angle, $\alpha$, generally of the order of 15° to 17° with respect to the nozzle centerline. The fluid leaves the nozzle at the maximum diameter at the end of the divergent section, indicated at E, the ratio of this exit area, $A_e$, to throat area, $A_t$, being known as the area expansion ratio or simply the expansion ratio, of the nozzle.

The optimum area ratio is a unique function of the pressure ratio, or ratio of internal pressure, $P_o$, at nozzle entrance, to the local ambient atmospheric (or receiver) pressure P of the environment into which the nozzle discharges.

It has been shown in the literature (see for example, George Sutton: "Rocket Propulsion Elements," John Wiley and Sons, New York, 1949), that the thrust per pound of propellant (which defines specific impulse) is maximum when the area ratio of the nozzle provides complete expansion so that the internal fluid pressure at nozzle discharge equals the local ambient pressure. It is also shown that this area ratio increases as the pressure ratio increases.

In the upper atmosphere the local ambient pressure decreases with altitude and approaches vacuum conditions in space, thus providing infinite pressure ratios even for low chamber pressures at the nozzle entrance. Infinite pressure ratios would require infinite area ratios. The larger the actual area ratio employed, the greater thrust, and hence specific impulse of the propellant.

Figures 2, 5, 6:
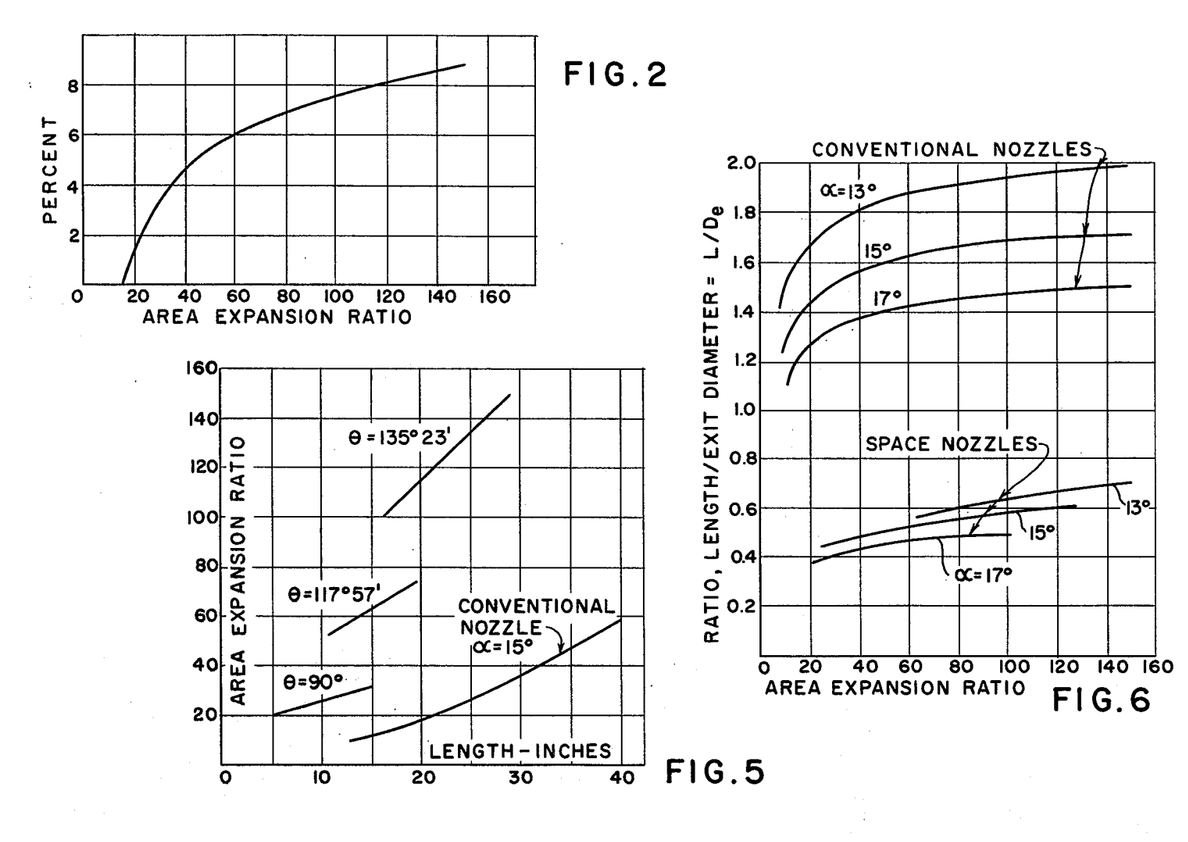
FIGURE 2 is a graph illustrating the percent increase in thrust under space conditions when the nozzle area expansion ratio is increased beyond a ratio of 15 used as reference.
FIGURE 5 is a graph showing results of engineering analysis of typical high expansion ratio nozzles, showing expansion ratio as a function of nozzle length, for the new space nozzle compared with a conventional nozzle.
FIGURE 6 is a graph showing relative lengths of space nozzles and conventional nozzles in non-dimensional form.

The actual theoretical improvement in nozzle thrust coefficient, or specific impulse under space flight conditions as the area ratio increases is shown in FIGURE 2 as a percent increase compared to an expansion ratio of 15 as a reference. It can be seen that an increase in area ratio from 15 to 60 provides a 6% increase in theoretical specific impulses; an increase from 15 to 150 provides an increase of 8.7%. These are large and worthwhile improvements, providing the increased area ratio may be conveniently provided without excess added weight and length. An increase in performance of upper stages results in large reduction in gross weight at launching, or conversely, an increase in payload, so the improvements in upper stages can be significant.

It may be seen from FIGURE 1, that the length, and hence the weight of the conventional nozzle increases rapidly as the nozzle wall is extended to provide larger area ratios. The divergence angle, $\alpha$, may not be increased to too large a value since flow divergence at the exit introduces losses, only the component of velocity parallel to the nozzle axis being useful in producing thrust. Frictional losses also increase as length increases.

Some improvement is achieved by replacing the frusto-conical wall of the divergent section with contoured expansion section having a variable divergence angle decreasing gradually towards the exit, but the improvement is one of degree rather than in kind.

Figure 3:
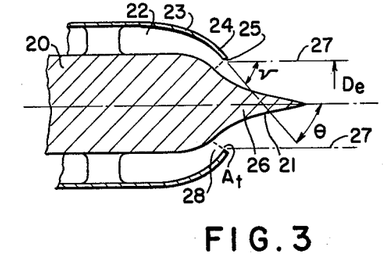
FIGURE 3 illustrates another known form of supersonic nozzle having external supersonic expansion, and sometimes referred to as a convergent plug nozzle, or, simply a plug nozzle. This nozzle and improved modifications are shown and described in my co-pending patent application referenced above.

FIGURE 3 illustrates another known form of a supersonic nozzle being variously described as: a nozzle employing external supersonic expansion; a convergent plug nozzle; or simply a plug nozzle. This nozzle, and variations on it, are shown and described in my co-pending patent application referenced above. This nozzle operates on the principle of Prandtl-Meyer flow around a corner. The sub-sonic flow of the working fluid is conducted through an annular channel 22 formed between the center body or plug 20, and a cowl 23, the latter having a convergent aft portion 24, formed at some angle, $\theta$, relative to the nozzle centerline, and terminating at a lip 25 which bounds a center opening. The center body 20 reduces in cross-section as its extends aft, to form a spike 26 having, preferably, a streamlined, axi-symmetric isentropic surface 21.

This surface is formed so that expansion waves reaching it from the cowl lip, are cancelled by compression waves due to curvature of the surface, so as to provide essentially shock-free, isentropic expansion.

Working fluid in the annular section 22 is directed radially inwardly towards the nozzle axis, the flow velocities increasing as flow area reduces in the approach section 28. The fluid then reaches sonic velocity at the minimum flow area formed between the cowl lip 25, and then isentropic surface 26, this being the throat area ($A_t$). The cowl is then terminated at the lip 25, with supersonic flow occurring as the fluid expands around the lip corner, 25 as indicated by the so-called Prandtl-Meyer angle, $\nu$, in FIGURE 3. The jet then forms its own free stream boundary with the atmosphere, as indicated by the lines 27. At the design altitude, the lines 27 are spaced apart a distance corresponding to the diameter of the cowl at the lip 25.

The angle $\nu$, through which the fluid turns at the lip, is an explicit function of the pressure ratio and a fluid property, $\gamma$, the ratio of specific heats of the fluid. This angle varies with ambient pressure at altitude for a constant chamber pressure at the nozzle inlet. This feature is used to improve the off-design performance; i.e. it reduces losses when operating at altitudes other than the design altitude. Further modifications of this nozzle principle and advantages therefrom are described in the above reference co-pending application.

While the length of the isentropic spike of FIGURE 3 may be shorter than the frusto-conical expansion section of FIGURE 1, it would be generally similar to the contoured nozzle, and thus does not greatly reduce the length.

The expansion ratio of the plug nozzle as above described is the ratio of cross-sectional area of the jet bounded by the streamlines 27 and which has a diameter corresponding to the diameter of the cowl at the lip 25, for design condition, to the annular area at the throat, as described above.

Several problems appear in the design of the plug nozzles for large area expansion ratios. These are: (1) the lip diameter of the cowl 25, must be increased to increase the jet cross-sectional area, requiring corresponding reduction in the gap between lip and the plug to maintain a given throat area. For relatively small thrust and high expansion ratios, this gap becomes small, increasing heat transfer coefficient as well as manufacturing tolerances; (2) it becomes difficult to provide sub-sonic flow passages to reach the annular channel 22 at the larger diameters necessary for high expansion ratios; and (3) the maximum diameter of the cowl structure 23 is always larger than the jet diameter 27, although this may be overcome by some internal supersonic expansion.

In summary, it may be seen that, in the conventional converging-diverging nozzle of FIGURE 1, the sub-sonic flow is axial; whereas in the known plug nozzle of FIGURE 3 the sub-sonic flow is directed radially inwardly towards the nozzle center at some desired angle, to an annular throat where it undergoes Prandtl-Meyer expansion by flow about a corner on the cowl, the plug having an isentropic surface.

In the new nozzle described in my co-pending application referenced above, with particular reference to FIGURE 40 and pages 62 and 63 thereof, and in the improvements described below, the sub-sonic flow is directed radially outwardly from the center at some desired angle, to an annular throat, where it undergoes Prandtl-Meyer expansion about a corner or lip which, instead of being on the cowl, is now located on the plug. The cowl rather than the plug now has an isentropic surface with supersonic expansion occurring internally therein. The jet forms a free stream boundary internally at the plug lip rather than externally at the cowl lip, this boundary being divergent, parallel, or convergent at the plug lip depending upon the pressure ratio.

Figure 4:
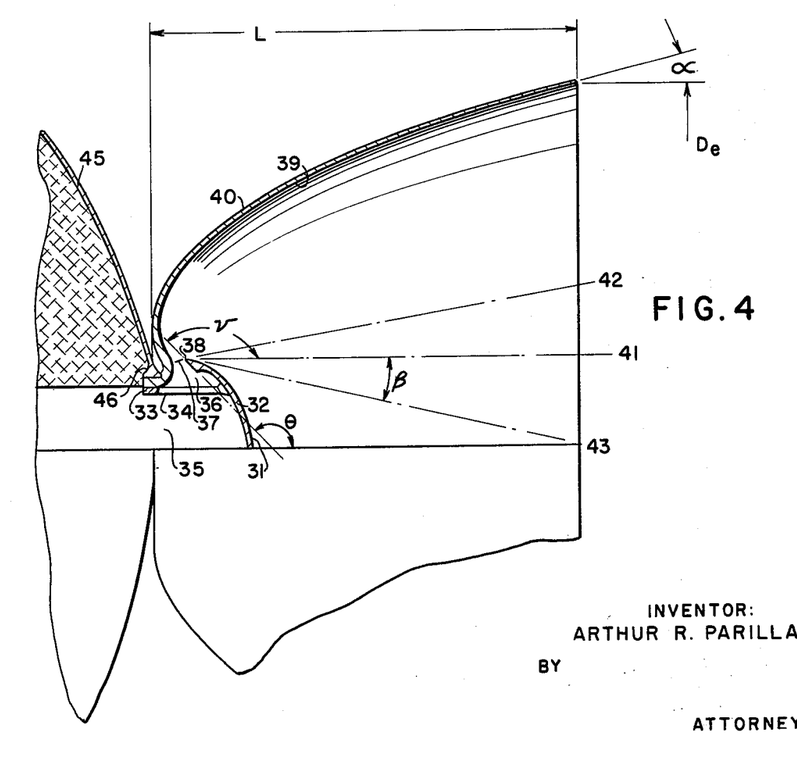
FIGURE 4 shows an improved form according to this invention, of a new high expansion ratio nozzle similar to FIGURE 40 of the above referenced patent application, but adapted for use with a solid propellant rocket engine.

This new nozzle is illustrated in FIGURE 4 of this application, in which the internal plug is shown at 31, having, preferably, a modified circular and semi-ellipsoidal aft end 32, with an integral cylindrical skirt 33, appended thereto and having a circular row of ports 34 which permit sub-sonic flow from the internal cavity or thrust chamber 35 to a converging annular approach section 36 leading to an annular throat section 37 formed between the lip 38 of the plug 31, and the isentropic surface 39 of the cowl 40.

The plug geometry is designed so that the lip 38 forms some desired angle, $\theta$, with the nozzle axis, and the lip diameter is selected so that the internal sub-sonic passages or ports 34 are substantially larger in area than the throat area.

In FIGURE 4, as the flow progresses radially outwardly, it is accelerated in the converging approach section 36 reaching sonic velocity in the throat section 37. At this point, the plug is terminated, the fluid undergoing supersonic expansion about the lip 38 of the plug, turning through some angle, $\nu$, the Prandtl-Meyer angle, as previously described.

While the angle of the plug lip $\theta$ is fixed by design geometry, the flow angle $\nu$ will vary with ambient pressure at altitude for any given chamber pressure.

When the angle $\nu$ equals the lip angle $\theta$, the inner boundary of the jet forms a right circular cylinder; i.e. an annular jet is discharged from the nozzle whose inner boundary is parallel to the nozzle axis, as illustrated by the broken line 38–41 in FIGURE 4. For convenience in carrying out the calculations, this condition is selected as the nozzle design condition, although this is not a necessary or limiting condition.

For altitudes (or more correctly, pressure ratios) below the design conditions, the higher ambient pressure causes the angle $\nu$, to be less, the internal jet boundary forming a diverging cone as shown by the broken line 38–42. For altitudes or pressure ratios above the design condition, the angle $\nu$, increases, the internal jet boundary forming a converging cone as shown by the broken line 38–43.

If desired, a conical inner body may be appended to the aft end of the plug 31, having a cone angle such as $\beta$, thus limiting further rotation of the flow at higher altitudes. It is believed, however, that such a conical inner body is unnecessary since the angular rotation of flow may be self-limiting at this position. For example, at increased altitudes, further reduction of ambient pressure cannot be transmitted upstream since supersonic flow will exist over the entire nozzle exit cross-section. Stagnant gases thus isolated within the inner cone will serve the same function without the weight of the conical inner body. The elliptical plug then saves weight on large nozzles when the conical inner body is eliminated.

The cowl is designed to provide complete isentropic expansion to the very large area ratios required for each design condition. This would require extremely large area ratios and nozzle length. It is then cut off at some cowl divergence angle $\alpha$, to provide an under-expanded nozzle, the length being determined by the actual area ratio and discharge divergence angle desired.

As shown in FIGURE 4, the plug and cowl may be fabricated as separate components for ease of fabrication, and mounted coaxially with suitable attaching means, such as threaded connections, or retaining rings, such as an Ortman ring well known in the art, and, in FIGURE 4, is shown attached to a flange 46 of a solid propellant rocket engine 45.

It may be seen that in the new nozzle, with the subsonic flow directed radially outwardly, the internal cavity 35 may be readily adapted to match the internal port area of the propellant grain, in contrast with the convergent plug nozzle of FIGURE 3, where sub-sonic passages are required to diameters larger than the jet diameter. As shown in FIGURE 4, the jet diameter may now be the same as the maximum cowl diameter, thus providing maximum utilization of available space for maximum expansion ratio. The gap between the plug lip 38 and the cowl isentropic surface is maximum for any given throat area.

Careful, detail engineering studies of the cowl geometry have shown that as the plug lip angle $\theta$, increases, the cowl isentropic surface becomes increasingly larger in diameter with little increase in length. Values of the angle $\theta$, greater than 90° in which the gases leave the throat area having a component of velocity in the forward direction, provide susbtantial increase in area expansion ratio even at lengths substantially shorter than conventional nozzles.

Results of these studies are shown graphically in FIGURE 5 where expansion ratio is plotted vs. nozzle length for a series of space nozzles having values of the angle $\theta$ equal to 90°; 117°57'; and 135°23'. A graph for conventional nozzle having a 15° divergent angle is also shown for comparison. The data is for a constant throat area of 8 square inches, and for a constant value of $\gamma$, ratio of specific heats equal to 1.25.

The reduction in nozzle length may be illustrated in non-dimensional form in the graph of FIGURE 6 where the ratio, $L/D_e$, of nozzle length to nozzle diameter at the exit, is plotted against area expansion ratio for both the new space nozzle and conventional nozzle for three values of $\alpha$, the divergent angle at the exit diameter (assumed constant for the conventional nozzle). The length of the new space nozzle is less than one-third of the length of the conventional nozzle, for the same area expansion ratio.

Even more impressive comparisons may be made in individual examples: in one case, the expansion ratio is increased to 52 compared with 15 for the conventional nozzle, with a simultaneous reduction in length to only 10.7 inches compared with 17.5 for the conventional nozzle. In another example, the expansion ratio is increased from 15 to 100, with a simultaneous reduction in length of almost one inch, compared to the conventional nozzle. In a third case, the expansion ratio is increased ten-fold, from 15 to 150, with only twelve inches increase in length.

In the above examples, and in FIGURES 5 and 6, the length of the conventional nozzle is taken as the length of the supersonic section only, as indicated by L of FIGURE 1; whereas, the length of the space nozzle is its overall length as shown by L of FIGURE 4 which includes the convergent section lying wholly within the nozzle cowl.

The estimated percent increase in actual specific impulse, including correction for estimated losses due to divergence angle at the exit, were found to be approximately 5%, 7% and 9.4% respectively for the three examples cited above; the space nozzle was estimated to weigh approximately 2.5, 5 and 10 pounds more than the conventional nozzle with the smaller expansion ratio of 15, in each of the above examples.

It must be understood, of course, that the above improvement is only applicable to upper stages of missiles operating in the upper atmosphere and in space. The new nozzle becomes inoperative at the low pressure ratios occurring at sea level or in the lower atmosphere. The new nozzle makes optimum use of the space environment for which it is designed. Actual ground tests of such nozzle may only be performed in facilities which can simulate high altitude conditions.

The operational altitude of the new nozzle is a function of the lip angle $\theta$, chamber pressure at nozzle inlet, and $\gamma$, the ratio of specific heats of the working fluid. The minimum altitude decreases as chamber pressure increases, and it increases as both the angle $\theta$, and $\gamma$ increase.

Figure 7:
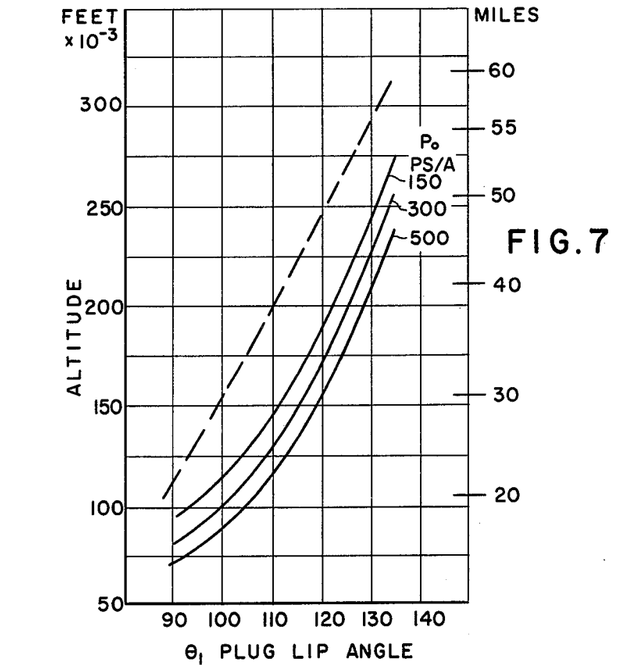
FIGURE 7 is a graph showing the operational altitudes of the new nozzle for use in the upper atmosphere and in space.

Design altitude is shown in FIGURE 7 as a function of the plug lip angle, for three assumed values of chamber pressure equal to 500, 300 and 150 p.s.i.a. The design altitude corresponds to an annular jet whose inner boundary is parallel to the nozzle axis, as previously described and shown by the line 38–41 of FIGURE 4. The minimum operational altitude may be lower than the design altitude, but has not been shown in FIGURE 7 since it is presumed operation will be substantially above these altitudes. The altitude for maximum nozzle expansion ratio corresponds to a pressure ratio rehulting in $\nu = \theta + \beta$. This occurs at altitudes above the design altitude and is estimated to be approximately as shown by the broken lines in FIGURE 7 for the chamber pressure at 300 p.s.i.a. only.

It may be seen that considerable flexibility exists in selecting plug lip angle $\theta$, and chamber pressure, to provide operation over a broad range of minimum altitudes for any value of $\gamma$, ratio of specific heats, and desired expansion ratio.

The nozzle shown in FIGURE 4 represents a fixed throat area nozzle. While the two piece construction permits some latitude in adjusting the actual magnitude of the throat area prior to launch, novel means may be provided to permit a variable throat area in flight.

The advantages of a variable throat area, and means for accomplishing this for the convergent plug nozzle, are fully described in the above referenced co-pending application. The advantages of variable area include, among other things, (1) means for varying thrust during flight by changing the nozzle area by positive external means; this permits any thrust-time relationship, including vernier adjustment of thrust to control flight velocity precisely, and other effects on performance; and (2) means for permitting the throat area to seek any position so as to maintain chamber pressure substantially constant, independent of temperature sensitivity of the propellant, regressivity or progressivity of the propellant grain, erosive burning of the propellant, erosion of material at the nozzle throat, and even minor defects in the propellant grain. Since the maximum pressure may be controlled, the weight of inert parts may be reduced by lowering hydrostatic test requirements.

Various control systems and actuators for the variable area nozzle are shown in the above referenced co-pending application, which may also be applicable to the space nozzle. Certain new features are described below.

Figures 8, 9:
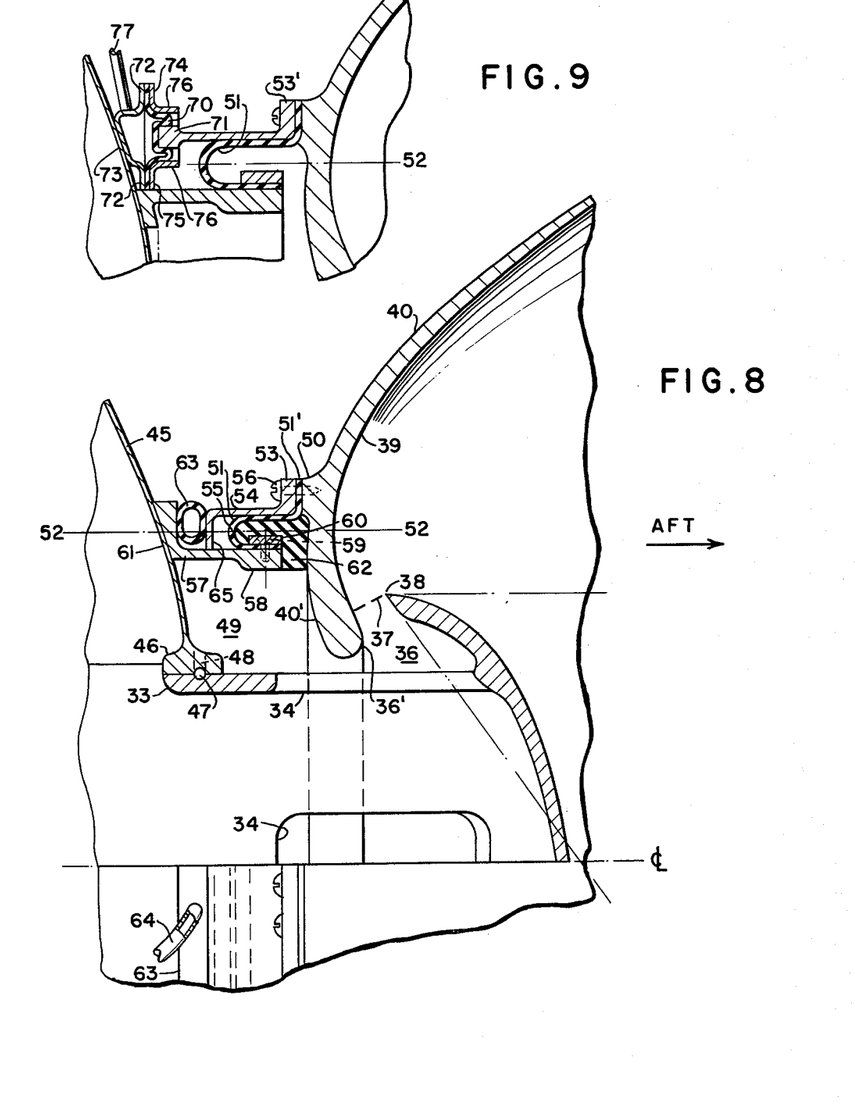
FIGURE 8 illustrates means, according to this invention, whereby the high expansion ratio nozzle may have a variable throat area requiring only nominal control forces, together with improved actuators for increased reliability.
FIGURE 9 illustrates a modification of the actuator of FIGURE 8 to provide a very low rate fluid spring for automatically positioning the movable member, thereby maintaining constant chamber pressure with a variable throat area.

FIGURE 8 is a fragmentary enlarged view of a nozzle such as the one shown in FIGURE 4, showing means for providing a variable throat area.

As shown in FIGURE 8, the plug 31 having a slightly longer skirt 33 is directly attached to the flange 46 of the rocket case 45, such as by the Ortman ring 47 inserted through a tangential slot 48. The cowl 40, mounted over the plug, is designed as described above, having an internal isentropic surface 39, terminating at its smaller diameter in a desired contour 36′ to form the convergent or approach section 36. In this case, however, the cowl inner diameter has adequate clearance with respect to the outer diameter of the plug skirt 33, with freedom of translational motion to vary the gap between the lip 38 of the plug and the isentropic surface 39 of the cowl, 40.

The internal fluid pressure acting on the cowl surface 39 produces a resultant force on the cowl, acting in the forward direction (to the left in FIGURE 8). This must be opposed by an external control force acting to position the cowl. In order to reduce the magnitude of the external control force, the cowl may be pressure balanced, similarly in principle to that described in my co-pending patent application above referenced. In this case, however, the balancing pressure is applied externally of the cowl over a lower portion of the forward face such as on the surface 40′ of FIGURE 8. For this purpose the annular flexible seal 51, described later, is mounted at a diameter larger than the diameter of the lip 38, such as on the centerline 52—52. The working fluid at its higher chamber pressure $P_o$, is admitted through ports 34 to both faces of the lower portion of the cowl 40. The pressure acting on the aft surfaces 36′ and 39 of the cowl are reduced rapidly as fluid is accelerated to supersonic velocity. The pressure within the cavity 49 acting on the lower forward face 40′ remains at chamber pressure $P_o$, since this is an area of stagnant fluid. The diameter of the seal, line 52—52, may then be selected to provide zero net force on the cowl, the pressure forces being exactly balanced; if this diameter 52 is slightly reduced, the cowl will have a net force acting forward, tending to increase the throat area responsive to chamber pressure; if this diameter 52 is slightly increased, the net force will act aft tending to decrease the throat area responsive to chamber pressure. Thus the cowl may be pressure balanced to provide neutral equilibrium under the action of pressure of the working fluid; or it may be biased to have a resultant force in either direction.

Generally, it is preferred to provide an unbalanced force on the cowl acting forward, thereby increasing throat area as chamber pressure increases. The increased throat area then acts to lower chamber pressure. The opposite case could lead to catastrophic failure. The slight unbalance of fluid forces on the cowl is then opposed externally by any type of hydraulic, pneumatic, or electrical actuator capable of imparting translational motion to the cowl.

The flexible seal 51 is similar to a diaphragm, having a radial flange 51′ at one end securely attached to a suitable boss 50, formed on the forward surface of cowl 40, held by screws 56 through a retainer 53, the latter having a cylindrical portion 54 engaging the seal and providing support to resist hoop stress, the seal carrying primarily the tensile longitudinal load due to pressure acting on the convolution 55. The opposite end of the flexible seal is securely attached to an abutment 57, having one end enlarged as at 58 for receiving screws 59 through a second retainer 60. The opposite end of the abutment 57 may be securely attached to the case 45 through an integral flange 61, which may be welded, adhesive bonded, or attached by other suitable methods to the case, as by screws (not shown). The abutment 57 may be modified to be supported from the plug skirt 33, providing a complete nozzle sub-assembly independent of the case, with only one point of attachment at the case flange 46. This would be heavier, the construction shown tending to reduce stresses since the pressure is equalized on the case in the region of the cavity 49. Insulating material 62, such as high temperature resistant sponge-like elastomer, may be placed internally within the flexible seal 51, thereby reducing heat transfer to it from the stagnant gases.

The flexible seal may be fabricated of the newer higher temperature resistant elastomers such as the fluoro-hydrocarbons, or various silicone compounds; with a high temperature resistant fabric reinforcement, such as fibreglass, or a fine wire mesh of high temperature metal filament, such as tungsten filament, eliminating strength as a limitation. The nominal stress in the flexible seal is low since the diameter of the convolution is small, and stress is independent of the diameter of the seal, 52—52.

While various linear actuators may be used to position the cowl, as stated above, FIGURE 8 illustrates the use of a novel bladder type actuator 63 in the form of a torus also fabricated of reinforced elastomeric materials. A fluid connection 64 which may be integrally molded with the bladder, permits fluid flow into and out of the bladder. A bladder type valve (not shown) such as described in my co-pending patent application Serial No. 567,008, now Patent No. 3,122,378, may also be used to control the flow of fluid into and out of the actuator 63, further increasing freedom from leakage, and other malfunctions associated with conventional valves. If desired, two connections such as 64 may be provided for continuous circulation of the control fluid through the bladder 63 as a coolant, cowl motion then being controlled by the relative openings of a dual bladder type valve, such as described in the above co-pending application.

The retainer 53 attached to the cowl 40 may be extended beyond the seal 51 to have a radial flange 65 engaging one side of the bladder 63 while the opposite side of the bladder engages the flange 61 of the abutment 57. An increase in fluid pressure within the bladder increases its circularity; the internal control pressure acting on the contact area between bladder and flange 65 actuates the cowl to decrease the throat area, increasing chamber pressure and thrust. A decrease in fluid pressure within the bladder causes the unbalanced cowl force to compress the bladder, increasing its ovality, and increasing throat area, reducing chamber pressure and thrust.

Since relatively small displacements of the cowl are required, the bladder actuator is ideally suited for this application. The relatively large diameter 52 provides a large effective area, requiring only low pressure fluid already used for other purposes aboard the missile. The effective area is uniformly distributed circumferentially, providing uniform translational motion of the cowl, without "cocking" as might occur with individual actuators, unless manifolded; the bladder then acts as both manifold and actuator.

The bladder type control shown in FIGURE 8 is useful for positive displacement of the cowl to control the thrust level responsive to any desired input. This satisfies one type of control outlined under (1), line 4, column 7 of this application.

For the second type control, when a low rate spring is desired to permit the cowl to seek any position in order to maintain a constant chamber pressure, the bladder type control above produces too high a spring rate. This is due to the relatively large change in effective area between the bladder and the respective flanges which it engages. The spring rate increases due to both pressure and area increasing with deflection.

Simple mechanical springs, such as individual coil springs, may be equally spaced circumferentially between suitable retainers on the cowl and the case (not shown). These again would require careful calibration to insure pure translational motion.

The spring rate of fluid springs may be made very low with the modification shown in FIGURE 9. In this case, the bladder 63 is replaced by an annular flexible diaphragm 70 in which the effective area remains constant with displacement. The retainer 53' is modified to have an enlarged end 71 engaging the diaphragm 70. The spring rate is now due only to a change in pressure due to a change in volume as the cowl is displaced.

The flexible diaphragm 70 is supported between flanges 72, formed on an annular enclosure 73, having any desired volume of control fluid stored therein; additional circular flanges 74 and 75 each having integral cylindrical portions 76, cooperate with flanges 72, with suitable attachment, such as adhesive bonding or screws (not shown) to form a pressure tight assembly. Further reduction in spring rate may be achieved by providing a fluid connection 77, connected to an auxiliary volume of fluid, further reducing spring rate by reducing change in pressure due to displacement of diaphragm 70 with cowl motion.

It may be seen with the arrangement shown in FIGURE 9, that the chamber pressure within the rocket engine may be maintained substantially constant at any desired value; however, the constant value of chamber pressure may be raised or lowered simply by regulating the pressure of the fluid in the annular enclosure 73; an increase in control pressure 73 would displace the cowl to reduce throat area, increasing chamber pressure constant over closer limits due to the low spring rate of the fluid spring. Thrust programming may then be provided as in the bladder type, either in flight or prior to launch, by regulating pressure of the control fluid, together with constant pressure operation at any selected pressure level.

It is shown in my co-pending patent application Serial No. 701,571, now Patent Number 3,094,072, that rotation of the cowl about a transverse axis will provide change in the direction of the thrust vector. This has since been confirmed by demonstration in actual firing tests. Vector control may also be incorporated in this new type space nozzle by such rotation of the cowl. The asymmetrical flow produced when the cowl is in a rotated position results in a lateral component of thrust used for control and stability of missiles.

The sealing arrangement of FIGURE 8 is well adapted to permit rotation as well as translation of the cowl. The actuators, both the bladder type and diaphragm type of FIGURES 8 and 9 are unsuited for rotation of cowl, and must be modified.

Figures 10, 10A, 11:
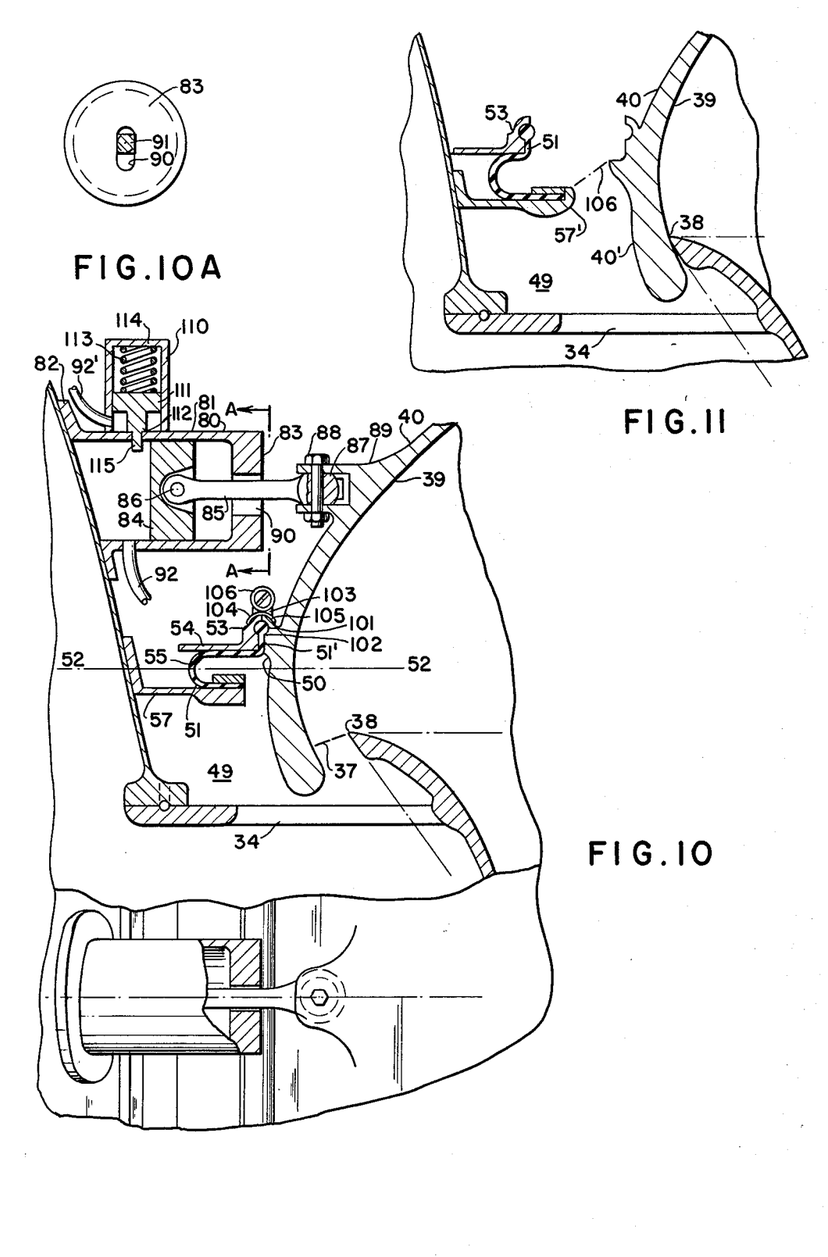
FIGURE 10 illustrates means for providing variable throat area, thrust vector directional control, and thrust termination or reversal in any combination.
FIGURE 10A is a view taken along line A—A of FIG. 10.
FIGURE 11 illustrates the position of the nozzle of FIGURE 10 in a non-propulsive or thrust reversal position.

A novel arrangement is shown in FIGURE 10 in which variable throat area, vector control, and thrust termination or reversal, may be provided in the new space nozzle, in any combination. Vector control may be achieved in both planes without the use of gimbal rings.

Four individual actuators 80, equally spaced circumferentially, replace the bladder 63, or diaphragm 70, type actuator of FIGURES 8 and 9, with unidirectional movement of all four actuators to provide translational motion of the cowl for variable area; and contra-directional motion of any two opposite pair of actuators while the remaining pair remain fixed, to provide rotational motion of the cowl for vector control. The kinematics of this arrangement, may be easily solved by the construction shown in FIGURE 10, in which a cylinder 81, has on one end a flange 82 adapted to be rigidly attached to the missile structure or rocket case, and at the opposite end an integral head closure 83. A piston 84 within the cylinder is attached to a connecting rod 85 by a piston pin 86, the opposite end of the connecting rod having a standard, commercially available spherical or ball joint 87 attached by the belt 88 to a lug 89 formed on or secured to the cowl 40.

The cylinder head 83 has a slot 90 which allows freedom of motion of the connecting rod 85 in the radial direction, permitting the rod to describe an arc at its aft attachment to the cowl when it is required to rotate the cowl. The connecting rod 85 makes close engagement with the sides of the slot in the circumferential direction, as shown in FIGURE 10A which is a view along line A—A of FIGURE 10. The rod may have a rectangular cross-section 91 over the portion of its length engaging the slot 90, thereby increasing bearing area. In this manner, when one pair of actuators 80 is stationary, the rod 85 acts as a bearing surface on the cylinder head 83 providing a fixed pivot point for rotation in the opposite plane.

It is noted that all actuators may be single acting, with pressure acting only on the head end. A single fluid connection 92 for each actuator is all that is required, the connecting rod end being open to local ambient pressure because of the slot 90. The unbalanced force on the cowl drives the pistons forward when control pressure in the actuator is reduced. The same is true during vector control, one actuator being pressurized to drive the piston aft to rotate the cowl while the opposite actuator is vented. Reliability of control system operation may be further increased by use of bladder type valves, such as described in my co-pending application Serial No. 567,008, now Patent No. 3,122,378, which eliminate problems due to valve leakage and other possible malfunctions.

It is known that in certain applications, the control of missile velocity in flight is critical, and positive means for thrust termination are desired when this velocity is reached. The variable area feature offers advantages in that vernier control of thrust may be provided prior to termination.

Present methods for thrust termination or reversal in solid propellant rockets require burst discs in the forward head closure, which are ruptured when a charge is detonated; the gases are then expelled in a forward direction neutralizing thrust.

Due to the weight of structural reinforcing rings required in the head closure to maintain structural integrity with the multiple openings required, plus the weight of ducts to discharge the gases outside of the missile envelope, the system adds considerable to the weight of inert parts, reducing the mass ratio of the stage.

A novel system of thrust termination and/or reversal may be readily incorporated with the high performance space nozzle as shown in FIGURE 10.

In this method, the flexible seal 51 is attached to the cowl by means which may be readily separated in flight. The radial flange 51' of the seal ends in a circular bead 101 similar to an O-ring, adapted to engage a groove 102 formed in the boss 50 of the cowl 40; a similar groove also being formed in the mating retainer 53. The screws 56 of FIGURE 8 securing the retainer 53 and seal to the cowl are now replaced by a quick release mechanism 103. While various quick release mechanisms are well known, for illustration, a clamp 104 generally similar to the commercially available Marmon clamp is shown, the clamp 104 having a curved or tapered internal surface 105 engaging a similar surface on the retainer 53 and the boss 50. The opposite ends of the Marmon clamp may be joined by an explosive bolt 106.

When thrust termination is desired, the explosive bolt 106 is energized as by electrical signal or impulse in known manner, the clamp 104 becoming disengaged. Fluid pressure acting on the seal convolution 55 causes the seal 51 and retainer 53 to be driven forward, the full chamber pressure acting on these surfaces until the seal separates from the boss 50.

The release of the seal in this manner is equivalent to a substantial increase in throat area, so that the chamber pressure and pressure distribution internally within the cowl falls rapidly. The control fluid pressure now acting on the pistons 84 provides a force which is greater than the opposing force within the cowl, thereby causing the cowl to be displaced aft automatically, closing the throat area 37, and discontinuing thrust in the aft direction.

FIGURE 11 illustrates the position of various parts during thrust termination. The lower portion of the forward face 40' of the cowl and the aft end 57' of the abutment 57, may be contoured and positioned to give the vented gases a thrust component in the aft direction, a new throat section 106 being formed. Since positive thrust (in the forward direction) is completely terminated by closure of the throat area 37, the magnitude of the reverse thrust developed may also be considerably reduced.

Another method of thrust termination, as illustrated in FIGURE 10A of my co-pending application Serial No. 701,571, may also be applied to the cowl 40 of FIGURE 10, and described as follows: The cowl 40 may be fabricated in two or more segments each extending over a portion of the circumference and joined together by a suitable quick release mechanism, such as explosive bolts. When the release mechanism is energized, the cowl 40 would be separated from the adjacent structure, rendering the nozzle non-propulsive.

The same effect may be accomplished by still another method (not shown), in which thrust termination may be achieved by disintegration of the weak cowl structure (which operates at low internal pressures), by an explosive charge mounted externally of the cowl. The cowl may be scored so that the mode of failure can be controlled and reproduced.

A different method for thrust termination exists, which may permit restarts, but this method would depend upon the properties of the propellant as well as nozzle design.

In this method, cowl displacement would first be restricted so as to vary the throat area only over a nominal range as required during powered flight operation. For thrust termination, means for restricting cowl motion would be removed, the cowl then being permitted to be displaced sufficiently to cause a sizable increase in throat area. The drop in chamber pressure is a function of $n$, the burning rate exponent of the propellant composition, larger values of $n$ causing greater drop in pressure for a given increase in throat area. The combination of a large increase in throat area plus a sufficiently high value of $n$ for the propellant would then produce a very low chamber pressure, even below sea level atmospheric pressure, due to the low ambient pressure at altitudes at which thrust termination would be required. When the chamber pressure dropped below the lower limit of combustion for the propellant, flame-out would occur. Re-starts would again be possible by re-ignition of the charge after the cowl was returned to normal operating position.

While there are various means whereby the above method of limiting cowl motion during operation may be executed, one method is shown in FIGURE 10, whereby a small locking device, such as the auxiliary piston and cylinder assembly 110 is attached to the actuators 80. A small piston 111 is urged downwardly against a land 112, by the spring 113, at all times. When thrust termination is desired, the conduit 92', leading to the auxiliary cylinder 114 is pressurized, causing piston 111 to move outwardly, the piston rod extension 115, clearing the cylinder wall 81 of the actuator. When the pressure in the actuator 80 is vented through the conduit 92 the piston 84 may be displaced to an extreme position beyond the mechanical lock 110. The nozzle can then be returned to an operative condition again by pressurizing 92 and depressurizing 92'.

Obviously, the spring 113 may be placed below the piston 111, the conduit 92' connected above the piston 111. Conduit 92 and 92' may then be joined. Piston 111 will then rise automatically whenever pressure in the single conduit feeding both 92 and 92' is vented below a minimum operating pressure. In the method shown, positive action is required venting one and pressurizing the other before the nozzle is placed in condition for thrust termination.

The nozzle configuration of FIGURE 4 illustrates nozzles having very high expansion ratios for use in upper atmosphere and in space when very high pressure ratios are available. The basic principle of supersonic expansion about a corner located on the plug may also be used at lower pressure ratios in the lower atmosphere and at sea-level. This requires a smaller plug lip angle $\theta$, as illustrated in FIGURE 12 where similar numerals refer to similar parts.

The cowl may again be balanced, or slightly unbalanced with a resultant in either direction, by selecting the diameter, line 52—52 of the seal 51, as described above. It may be seen that the nozzle length may again be reduced with some improvement in the disposition of the subsonic flow passages.

Variable area, vector control and thrust termination or reversal may also be added similar to the methods described above.

Figure 12:
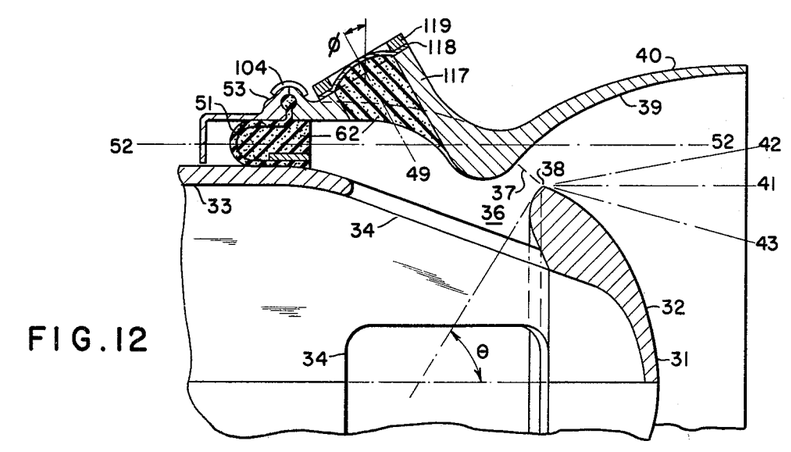
FIGURE 12 illustrates adaptation of the new nozzle fluid flow principles to nozzles for operation in the lower atmosphere and at sea-level.

In addition to the methods for thrust termination described above in connection with FIGURE 10, another optional method is illustrated in FIGURE 12. This method, which is similar to that shown in FIGURE 10B of my co-pending patent application Serial No. 701,571, provides auxiliary ports such as shown at 117, FIGURE 12, located forward of the throat area 37, in the sub-sonic portion of the cowl 40, and communicating with the cavity 49. The ports, equally spaced circumferentially, may be disposed at some angle $\phi$, FIGURE 12, measured counterclockwise from and with respect to a normal to the nozzle axis, in order to provide thrust reversal; or may be normal to the nozzle axis to provide only thrust termination ($\phi=0$).

A burst disc, 118, is sealingly secured to the port 117 by a retainer ring 119 secured thereto by a threaded connection, adhesive bonding, or screws (not shown). Internal passages of the port 117 as well as the burst disc may be lined and protected with a layer of insulation material such as 62, also used to protect the seal 51, as previously described.

When it is desired to terminate or reverse thrust, the burst disc 118 may be ruptured either by detonation of an explosive charge (not shown), placed therein and energized by electrical signal or impulse in known manner, or by closure of the variable area throat 37 by cowl displacement aft, thus increasing the fluid pressure in the cavity 49. Since the increase in pressure would also result in some increase in thrust prior to termination or reversal, and since all discs might not rupture uniformly or simultaneously, other methods may be preferable. Another method for simultaneous opening of all flow passages 117 may be as described and shown in FIGURE 10B of the above referenced patent application, in which method a single band circumferentially disposed externally about all ports 117 and sealingly secured thereto, is removed by a quick release mechanism.

It is understood that the various thrust termination or reversal means described above, represent alternate methods, each type being used as best adapted to a specific missile installation. In most types, when variable area is combined with the nozzle, positive (normal) thrust may be terminated completely by closure of the variable throat area 37. When thrust reversal is used, as shown in FIGURE 12, displacement of the cowl 40 for closure of the variable throat area 37 may be accomplished automatically by the reverse thrust component acting on the cowl parallel to the nozzle centerline.

When vector control means are combined with the nozzle, such vector control may also be used during reverse thrust operation of the rocket engine.

It is understood that further improvements, such as materials of construction, construction methods, high temperature resistant coatings, cooling methods, insulating materials, etc., may be applied to various combinations to the various designs, as is well known in the art, without specific description or drawings thereof included in this application.

The basic gas dynamics of the space nozzle are applicable to any jet engine. FIGURE 4 illustrates the nozzle attached to a solid propellant rocket engine.

When the space nozzle is used for liquid propellant rocket engines, certain new features may be incorporated which make possible further reduction in the overall size of liquid rocket engines.

In liquid rocket engines, the dimensions of the thrust chamber cylindrical portion are quite small compared to nozzle dimensions. As the nozzle expansion ratio further increases, the nozzle becomes by far the major portion of the engine.

It may be observed in FIGURE 4 that the central portion of the space nozzle is unused volume (represented by the area of the convergent cone within angle $\beta$, FIGURE 4).

Also, it may be noted that for operation in the upper atmosphere and in space, the angle $\beta$ exceeds 90° for maximum expansion ratio in minimum length. The gases at the throat 37 then have a component in the forward direction, with the sub-sonic flow required to turn more than 90° when the gases are generated forward of the nozzle cowl.

Advantageously and in accordance with a further feature of this invention, this unused volume may be utilized as a liquid propellant thrust chamber for space flight so that the thrust chamber may be contained within the space nozzle itself. To this end, the plug 31 of FIGURE 4 is replaced by the thrust chamber 120 as illustrated in FIGURE 13, where the same numerals refer to the same parts described in FIGURE 4.

Figure 13:
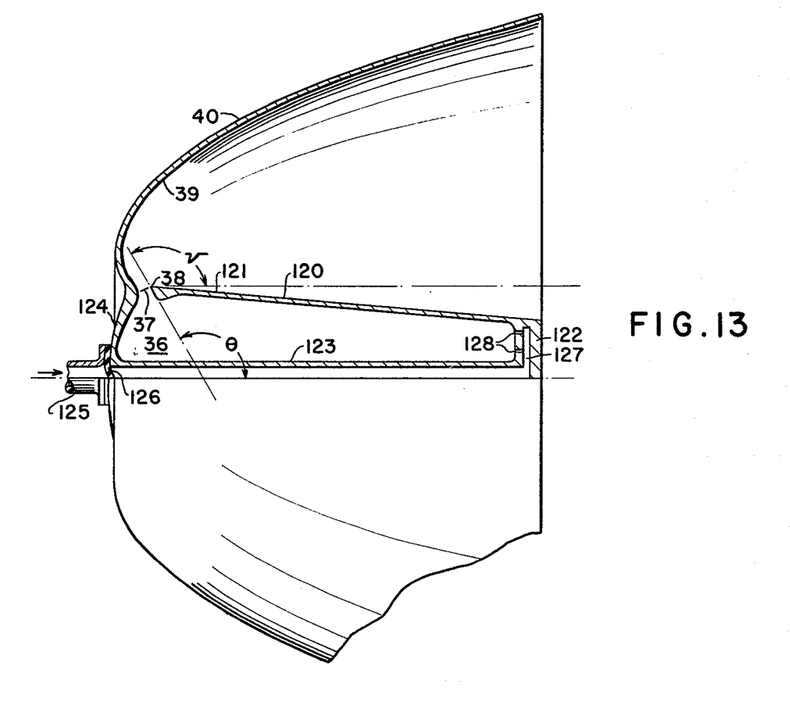
FIGURE 13 illustrates a novel configuration for liquid propellant rocket engines in which the thrust chamber is internally mounted within a high performance, large expansion ratio nozzle.

For simplicity in illustration, FIGURE 13 shows an uncooled thrust chamber 120 using a liquid monopropellant, centrally mounted internally within and axisymmetrically of the space nozzle. The thrust chamber outer wall 121 forms the lip 38 and extends aft therefrom a suitable length to provide the desired internal volume for the thrust chamber. The wall may be cylindrical, although a frusto-conical shape may be preferred, as shown. The aft end of the thrust chamber forms the injector 122 connected by the central tube 123 to the forward portion 124 of the cowl, which may be formed integrally with the cowl 40, as shown. When a supply of liquid propellant under pressure is available at the inlet 125, the burst disc 126 is ruptured, propellant flowing through tube 123 to the injector 122, through suitable passages 127 to orifices 128 where it is injected into the thrust chamber. Ignition may occur by any of the many well-known methods (not shown), the gaseous products of combustion then being accelerated through the convergent section 36 to sonic velocity at the throat 37, followed by Prandtl-Meyer flow about the lip 38, as previously described.

Figure 14:
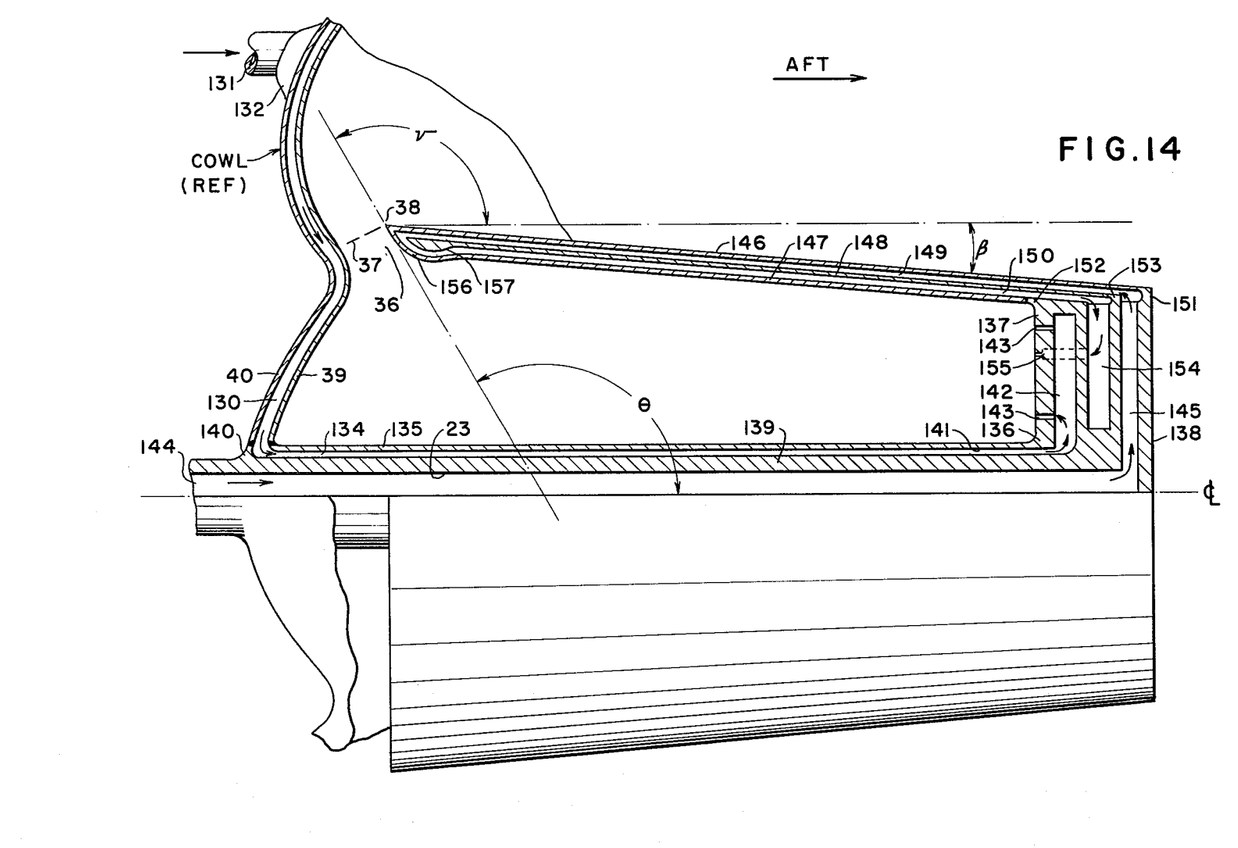
FIGURE 14 illustrates one method for regeneratively cooling the nozzle and thrust chamber of FIGURE 14.

FIGURE 14 is an enlarged fragmentary view of a modification of the internally mounted thrust chamber of FIGURE 13, whereby a bi-propellant system may be used with regenerative cooling of both the nozzle cowl and thrust chamber. In this case, one reactant is used to cool the cowl, or portion thereof near the throat section, and the internal supporting structure, and the second reactant is used to cool the thrust chamber.

In the construction shown in FIGURE 14, the cowl is fabricated of inner and outer walls 39' and 40' joined internally by radially disposed webs or stiffeners 130 so as to provide, between these walls, radially disposed channels each closed at its outer end and open at its inner end. The inner cowl wall 39' is sealingly joined at its inner end to one end of a central tube 135, the latter being sealingly joined at its other end to an annular flange 136 extending axially forward from the forward face of an injector which, as a unit, is designated by the numeral 138.

A second tubular member 139 of heavier wall construction extends forward from within injector 138 through the forward end of the cowl and concentric with the tube 135, and has a smaller diameter than flange 136; the outer surface of the second tube forming an annular flow passage 134 with the inner surface of the first tubular member 135. The tube 139 has an annular flange 140 at a point forward of the inner cowl wall 39', which is sealingly connected to the outer wall 40'.

A flow channel is thus established whereby one reactant enters the inlet at 131, joined to a manifold 132 attached to the outer cowl wall 40'. It is distributed circumferentially by the manifold to feed, through suitable inlet ports in the wall 40', the radial channels formed by the stiffeners 130 and inner and outer walls 39' and 40'. This reactant then flows through the annular channel 134 to the injector inlet 141 where it is distributed through suitable radial passages 142 to orifices 143, and thence into the thrust chamber formed by: the cowl inner wall 39', the outer tube 135, the injector 138, and a wall section 147 to be described more fully hereinafter.

The first reactant thus cools the cowl and the internal structure joining the thrust chamber to the cowl; the internal tube 139, cooled by flow of this reactant through the annular flow passage 134, being designed to carry the structural loads encountered.

The second reactant enters at 144 through suitable connections (not shown) to the inner tubular member 139, flowing internally to the aft portion of injector 138 where it is distributed through multiple radial passages 145 to cool the thrust chamber outer wall and the plug lip 38.

This is done by the construction shown in which reverse flow occurs within the thrust chamber outer wall which comprises an outer frusto-conical wall section 146, an inner frusto-conical wall section 147, with a frusto-conical baffle 148 located therebetween, forming an external annular flow passage 149 and an internal annular flow passage 150. The internal wall section 147 has a gentle radius of curvature at its forward end 156 to form with the cowl inner wall 39', the approach section 36; the wall section 147 ending in the corner 38 where it sealingly joins the outer wall section 146. The internal baffle 148 is enlarged locally at its forward end 157 in the region of the radiused end 156 to maintain local high velocities of the coolant.

The outer wall section 146 is attached sealingly, circumferentially to the annular rim flange 151 located near the aft face of the injector 138; the inner wall section 147 being sealingly, circumferentially attached to the annular rim flange 152 located at the forward face 137 of the injector, while the internal baffle 148 is sealingly, circumferentially attached to an intermediate rim flange 153 located just forward of the rearmost radial passage 145.

The second reactant then flows from the injector passages 145 through the external flow passage 149, in a forward direction where it reverses about the enlarged forward end 157 and returns through the internal flow passage 150 where it communicates with intermediate radial flow passages 154 in the injector 138, thence through orifices 155, into the thrust chamber 120.

Ignition may be spontaneous, as with hypergolic propellants, or by any of the well known methods (not shown), the products of combustion then being discharged from the throat section 37 with Prandtl-Meyer flow about the lip 38, as previously described.

The use of both reactants to cool each portion of the engine as described reduces the amount of heat rejected to only one reactant if it were required to cool both the cowl and thrust chamber; it also reduces the pressure drop which would result when a single reactant must flow through all the passages, the pressure drop and heat rejection being divided between the two reactants.

Figure 15:
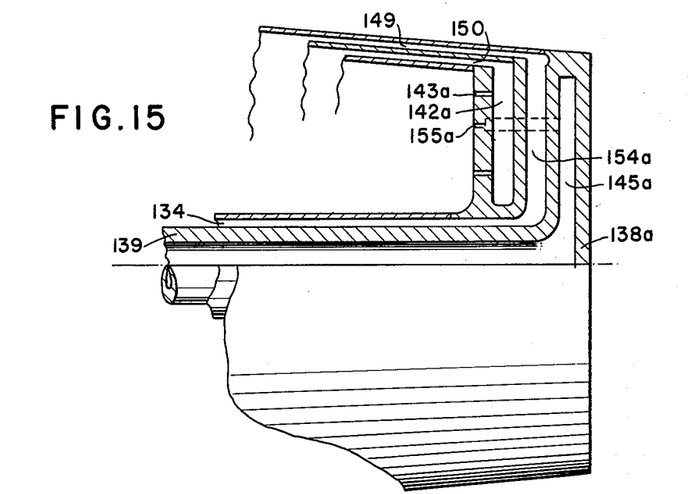
FIGURE 15 illustrates modification of the flow passages and cooling methods from that shown in FIGURE 14.

There may be cases, however, where one of the reactants is unsuited for use as a coolant, or, unavailable, as in a simple liquid monopropellant system. The use of a single reactant to cool both the cowl and thrust chamber may be readily accomplished by suitable modification of the flow passages in the injector design, and injector attachment to the thrust chamber walls, as illustrated in FIGURE 15.

In this arrangement, the reactant used to cool the cowl and flowing through channel 134, communicates with radial passages 154a of the injector, thence to the external flow passage 149, with reverse flow at the lip as previously described, and returning through the internal flow passage 150 to the forward radial flow passage 142a in the injector, through suitable orifices 143a into the thrust chamber.

When a second reactant is used, it enters through the central tube 139 as previously described, flowing through the radial flow passages 145a in the injector, and thence directly into the thrust chamber through suitable orifices 155a, with a minimum flow path length and exposure to high temperatures.

Thus, a liquid propellant rocket engine for space flight may be provided with the thrust chamber internally mounted within a high performance, large expansion ratio space nozzle, in which the overall dimensions may not exceed that of the nozzle itself.

It is understood that while the main elements of this invention have been described, various detail modifications may be made without departing from the scope of this invention.

For example, while flexible seals are shown and described with the variable area and vector control means (FIGURES 8, 9, 10, 11, 12), conventional piston and cylinder seals, such as O-ring seals may be used between sliding surfaces to obtain the same results; vector control may be accomplished in a similar manner, with rotation of the cowl obtained by such seals engaging spherical surfaces on such mating parts. In a similar manner, thrust termination may be achieved by separating such sealing surfaces from the cowl structure substantially as described. The variable area cowl of the low altitude nozzle shown in FIGURE 12 may be modified for use as a fixed throat area nozzle by means similar to that shown in FIGURE 4.

The various missile control systems shown and described in detail in my co-pending patent application Serial No. 701,571 may also be used to control the propulsion devices described herein.

What is claimed is:

1. A thrust nozzle for use with compressible working fluids comprising wall means forming an internal cavity providing a thrust chamber, said wall means also forming a fluid-conducting passageway for receiving compressible working fluid from said thrust chamber, said passageway being directed radially outwardly from, and having its flow axis inclined to, the geometric thrust axis of the nozzle, for accelerating the flow of said compressible working fluid in transit through the passageway, said passageway decreasing in cross-sectional area progressively from a maximum at its inlet end to a minimum at its outlet end, to provide a throat at said outlet end, said wall means also forming an expansion chamber having connection at one end, its inlet end, with said throat for receiving a stream of said working fluid discharging from said throat, and having connection at another end, its outlet end, with the surrounding space, said expansion chamber increasing in cross-sectional area progressively from its inlet end to its outlet end, said wall means including a first wall member and a second wall member, each said wall member having a surface portion spaced radially of said thrust axis and subtsantially axially from the surface portion of the other, to form said inclined passageway, said first wall member extending beyond said throat to form said expansion chamber, and said second wall member surface fortion terminating at said throat to provide a lip at said throat for Prandtl-Mayer expansion of said working fluid issuing from said throat, around said lip into said expansion chamber and resultant formation of a jet of said working fluid having a free stream boundary within said expansion chamber.

2. A nozzle in accordance with claim 1, in which said second member surface portion is inclined forwardly with respect to said thrust axis at an angle of at least 90°.

3. A nozzle in accordance with claim 1, in which said first and second wall members are movable relative to each other lengthwise of said thrust axis, for varying the throat area of said passage.

4. A nozzle in accordance with claim 1, in which said first wall member comprises an axi-symmetric cowl concentric with said thrust axis and in which said second wall member comprises a shell extending aft from said cowl concentric with said thrust axis, the forward end of said shell forming said lip, an injector closing the other end of siad shell, for injecting liquid propellant into the interior of said shell for combustion therein, and a tube concentric with said thrust axis and passing aft through said cowl to said injector, for supplying liquid propellant to said injector.

5. A nozzle in accordance with claim 4, in which said shell is frusto-conical and said lip is formed by the larger diameter end of the shell, said lip being at an angle with said thrust axis of at least 90°.

6. A nozzle in accordance with claim 4, in which said shell is frusto-conical and said lip is formed by the larger diameter end of the shell, said lip being at an angle with said thrust axis of less than 90°.

7. A nozzle in accordance with claim 1, in which said first wall member comprises an axi-symmetric cowl concentric with said thrust axis, said cowl having passages for conducting a first liquid reactant through the cowl, to cool the cowl, and in which said second wall member comprises a shell extending aft from said cowl and concentric with said thrust axis to form a thrust chamber in part, the forward end of said shell forming said lip and said shell having a passage for circulating a second liquid reactant through said shell to coll the same, an injector closing the other end of the shell, said injector having flow distribution passages for distributing liquid reactant to said shell passage and said thrust chamber, a first tube, concentric with said thrust axis, for conducting said second liquid reactant to said injector for distribution to said shell passage, and a smaller diameter tube concentric with said first tube and forming an annular passage therewith connecting said cowl passage with said thrust chamber through said injector distribution passages.

8. A space thrust nozzle for rocket engines operating at high pressure ratios corresponding to high altitude or space flight, comprising a cowl for internal expansion of a compressible working fluid; and, a plug concentrically positioned within said cowl, said plug forming an internal cavity providing a thrust chamber, said plug also forming an annular passage with a portion of said cowl for receiving compressible working fluid from said thrust chamber, said passage being directed radially outwardly from, and having its flow axis inclined to, the thrust axis of the nozzle, and said passage decreasing in cross-sectional area progressively from a maximum at its inlet end to a minimum at its outlet end, to provide a throat at its outlet end, and the portion of said plug which forms said annular passage with said cowl portion, terminating at said throat to provide a corner at said throat for Prandtl-Meyer expansion of said working fluid issuing from said throat, around said corner into said cowl and resultant formation of a jet of said working fluid having a free stream boundary within said cowl.

9. A thrust nozzle for rocket engines comprising an annular axi-symmetric cowl of circular cross-section for internal expansion of a compressible working fluid; a plug concentrically positioned within said cowl, said plug forming an internal cavity providing a thrust chamber, said plug also forming an annular passage with a portion of said cowl for receiving compressible working fluid from said thrust chamber, said passage being directed radially outwardly from, and having its flow axis inclined to, the thrust axis of the nozzle, and said passage decreasing in cross-sectional area progressively from a maximum at its inlet end to a minimum at its outlet end, to provide a throat at its outlet end, and said plug having a corner at said throat for Prandtl-Meyer expansion of the compressible fluid around said corner within said cowl; means including a flexible sealing member, yieldably coupling the cowl and plug for relative movement, said yieldable coupling means forming a pressure-balancing chamber with said cowl portion, for receiving said compressible fluid; and, independently controllable means for applying a force to said cowl to move said cowl relative to said plug.

10. A nozzle in accordance with claim 9, in which said coupling means includes a clamping member releasably secured to said cowl, said flexible sealing member being releasably sealingly clamped between said clamping member and said cowl, said cowl and said coupling means forming on release of said clamping member a passage for venting said pressure-balancing chamber, to provide thrust termination.

11. A nozzle in accordance with claim 9, in which said force applying means is an annular inflatable and collapsible bladder of flexible material, said bladder being connected to a separate source of fluid under pressure.

12. A nozzle in accordance with claim 9 in which said force applying means comprises four piston and cylinder units equally spaced apart around said cowl, each unit comprising a piston rod pivotally connected at one end to the piston of the unit, said cylinder having a guide-way through which said rod extends, said guide-way being dimensioned to confine said rod to movement in one plane, and said cowl being pivotally connected to the other end of said rod for pivotal movement in a plane at right angles to said guide-way plane.

13. A solid propellant rocket engine for operation at high pressure ratios corresponding to high altitude or space flight, comprising an axi-symmetric cowl having an isentropic surface for internal expansion of a compressible working fluid, an axi-symmetric plug concentrically postioned within said cowl, said plug forming an internal cavity providing a thrust chamber, said plug also forming an annular passage with a portion of said cowl for receiving compressible working fluid from said thrust chamber, said passage being directed radially outwardly from, and having its flow axis inclined to the thrust axis of the nozzle, and said passage decreasing in cross-sectional area progressively from a maximum at its inlet end to a minimum at its outlet end, to provide a throat at its outlet end, and said plug having a corner formed at said throat for Prandtl-Meyer expansion of the compressible fluid around said corner within said cowl; means for effecting relative translational movement between said cowl and said plug to vary the throat area; means independent of chamber pressure for limiting said translational movement to predetermined operating limits; and, control means for rendering said limiting means inoperative at will to enable the translational movement to be increased beyond the operating limits, for purposes of thrust termination and re-starts.

14. A solid propellant rocket engine in accordance with claim 13, including means for rendering said limiting means again operative upon return of the cowl and plug to a relative position within said predetermined operating limits.

15. A thrust nozzle for reaction engines capable in use of providing both thrust magnitude control and thrust vector directional control, said nozzle comprising an external cowl member and an internal plug member forming an annular throat area therebetween; means for providing relative translational motion between said cowl member and said plug member to vary the annular throat area for thrust magnitude control; means for providing relative rotational motion between said cowl member and said plug member about at least one transverse axis normal to the axis of symmetry for thrust vector directional control; and, single control means to actuate both said thrust magnitude control means and said thrust vector directional control means, said single control means comprising at least two actuators circumferentially mounted 180° apart and circumferentially displaced 90° relative to said transverse axis of rotation, said actuators operating uni-directionally to provide relative translational motion between said cowl member and said plug member for thrust magnitude control, and operating contra-directionally to provide relative rotational motion between said cowl member and said plug member for thrust vector directional control.

16. A solid propellant rocket engine in which the thrust magnitude is controllable and in which the thrust is terminable at will, comprising a nozzle having a variable throat area; control means for varying the throat area; a propellant whose burning rate has a relatively high sensitivity to chamber pressure and having a minimum pressure below which combustion ceases; locking means for said control system to limit the action of said control means to a normal operating range at which said chamber pressure will be maintained above said minimum, to vary thrust magnitude; and, means for disengaging said locking means from said control system to enable the throat area to be increased to a magnitude outside said range at which said chamber pressure will fall below said minimum to terminate said thrust.

17. The method of controlling the magnitude of thrust including terminating thrust in solid propellant rocket engines having a variable throat area nozzle and control means for varying the throat area, comprising providing a solid propellant whose burning rate has a relatively high sensitivity to thrust chamber pressure and having a minimum pressure below which combustion ceases; operating the control system to vary the nozzle throat area over a normal operating range at which said chamber pressure will be maintained above said minimum, for thrust magnitude control; and operating the control system to increase the throat area to a magnitude at which said chamber pressure will fall below said minimum, to terminate said thrust.

18. The method of controlling the magnitude of thrust including terminating thrust and restoring thrust in solid propellant rocket engines having a variable throat area nozzle and control means for varying the throat area, comprising providing a solid propellant whose burning rate has a relatively high sensitivity to thrust chamber pressure and having a minimum pressure below which combustion ceases; operating the control system to vary the nozzle throat area over a normal operating range at which said chamber pressure will be maintained above said minimum, for thrust magnitude control; operating the control system to increase the throat area to a magnitude at which said chamber pressure will fall below said minimum, to terminate said thrust; and, thereafter operating the control system to restore said throat area to a magnitude at which said chamber pressure can be raised again to a pressure above said minimum, to permit restart.

19. A space thrust nozzle for rocket engines operating at high pressure ratios corresponding to high altitude or space flight, comprising a circular cowl concentric with the nozzle thrust axis and having an inner surface shaped to provide an isentropic expansion surface extending lengthwise of the thrust axis; and, a partitioning member concentric with said cowl and partitioning the space enclosed by said cowl into an inner, thrust, chamber and an outer, expansion, chamber, both concentric with said cowl, said partitioning member forming, with a portion of said cowl, an annular passage concentric with said cowl and connecting said thrust and expansion chambers, said passage being directed radially outward from, and having its flow axis inclined to, the thrust axis of the nozzle, for receiving elastic working fluid from said thrust chamber and discharging said fluid into said expansion chamber, said passage having its minimum cross-sectional area at its discharge end, to provide a throat at said discharge end, and the portion of said partitioning member which forms said annular passage with said cowl portion, terminating at said throat to provide a corner at said throat for Prandtl-Meyer expansion of said working fluid issuing from said throat, around said corner into said cowl and resultant formation of a jet of said working fluid having a free stream boundary within said cowl.

20. A space thrust nozzle for rocket engines operating at high pressure ratios corresponding to high altitude or space flight, comprising a cowl for internal expansion of a compressible working fluid; a plug concentrically positioned within said cowl, said plug forming an internal cavity providing a thrust chamber, said plug also forming an annular passage with a portion of said cowl for receiving compressible working fluid from said thrust chamber, said passage being directed radially outwardly from, and having its flow axis inclined to, the thrust of the nozzle, and said passage decreasing in cross-sectional area progressively from a maximum at its inlet end to a minimum at its outlet end, to provide a throat at its outlet end, and said plug having a corner formed at said throat for Prandlt-Meyer expansion of the compressible fluid around said corner within said cowl; said cowl being provided with at least one additional passage providing a surface in pressure-balancing relation to a surface of said annular passageway; closure means normally closing said additional passage; and, means for actuating said closure means to open said additional passage to diminish the flow through said annular passage, said additional passage being forwardly inclined relative to the center-line of the nozzle for generating reverse thrust on opening of said additional passage.

References Cited in the file of this patent

UNITED STATES PATENTS

| | | |
|---|---|---|
| 1,879,579 | Stolfa et al. | Sept. 27, 1932 |
| 2,493,725 | McMorris | Jan. 3, 1950 |
| 2,633,700 | Goddard | Apr. 7, 1953 |
| 2,850,976 | Seifert | Sept. 9, 1958 |
| 2,870,603 | Long | Jan. 27, 1959 |
| 2,935,841 | Myers et al. | May 10, 1960 |

FOREIGN PATENTS

| | | |
|---|---|---|
| 157,231 | Switzerland | Dec. 1, 1932 |
| 259,489 | Switzerland | Jan. 3, 1951 |